(12) United States Patent
Autenrieth et al.

(10) Patent No.: US 6,696,027 B1
(45) Date of Patent: *Feb. 24, 2004

(54) REFORMATION REACTOR WITH CATALYST CHARGING

(75) Inventors: Rainer Autenrieth, Erbach (DE); Andreas Christen, Kehr (DE)

(73) Assignee: Ballard Power Systems AG, Kirchheim/Teck-Nabern (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 44 days.

(21) Appl. No.: 09/048,984

(22) Filed: Mar. 27, 1998

(30) Foreign Application Priority Data

Mar. 29, 1997 (DE) .......................................... 197 13 244

(51) Int. Cl.⁷ .................................................. B01J 8/06
(52) U.S. Cl. ........................ 422/232; 422/219; 422/196
(58) Field of Search ................................ 422/188, 189, 422/195, 197, 198, 200, 205, 211, 213, 219, 220, 232

(56) References Cited

U.S. PATENT DOCUMENTS

| | | | |
|---|---|---|---|
| 2,671,719 A | | 3/1954 | Lewis et al. |
| 3,770,388 A | * | 11/1973 | Zenz .......................... 422/219 |
| 5,238,659 A | * | 8/1993 | Tajiri et al. ................. 422/219 |
| 5,478,531 A | * | 12/1995 | Yoshikawa .................. 422/177 |

FOREIGN PATENT DOCUMENTS

| | | | |
|---|---|---|---|
| CA | 2030915 | * | 5/1991 |
| DE | G 90 00 603.8 | | 5/1990 |
| DE | 40 31 514 A1 | | 4/1992 |
| DE | 44 20 752 A1 | | 9/1995 |
| DE | 44 23 587 A1 | | 1/1996 |
| EP | 0 812 802 A2 | | 12/1997 |

* cited by examiner

*Primary Examiner*—Hien Tran
(74) *Attorney, Agent, or Firm*—Crowell & Moring LLP

(57) ABSTRACT

A reformation reactor that can be used especially for steam reformation of methanol for generating hydrogen in motor vehicles operated by fuel cells. A gas stream to be reformed is conducted through a reaction chamber into which a charge of a catalyst material is added. A catalyst supply container connected with the reaction chamber is so arranged that the catalyst material is automatically added from the supply container to the reaction chamber.

3 Claims, 1 Drawing Sheet

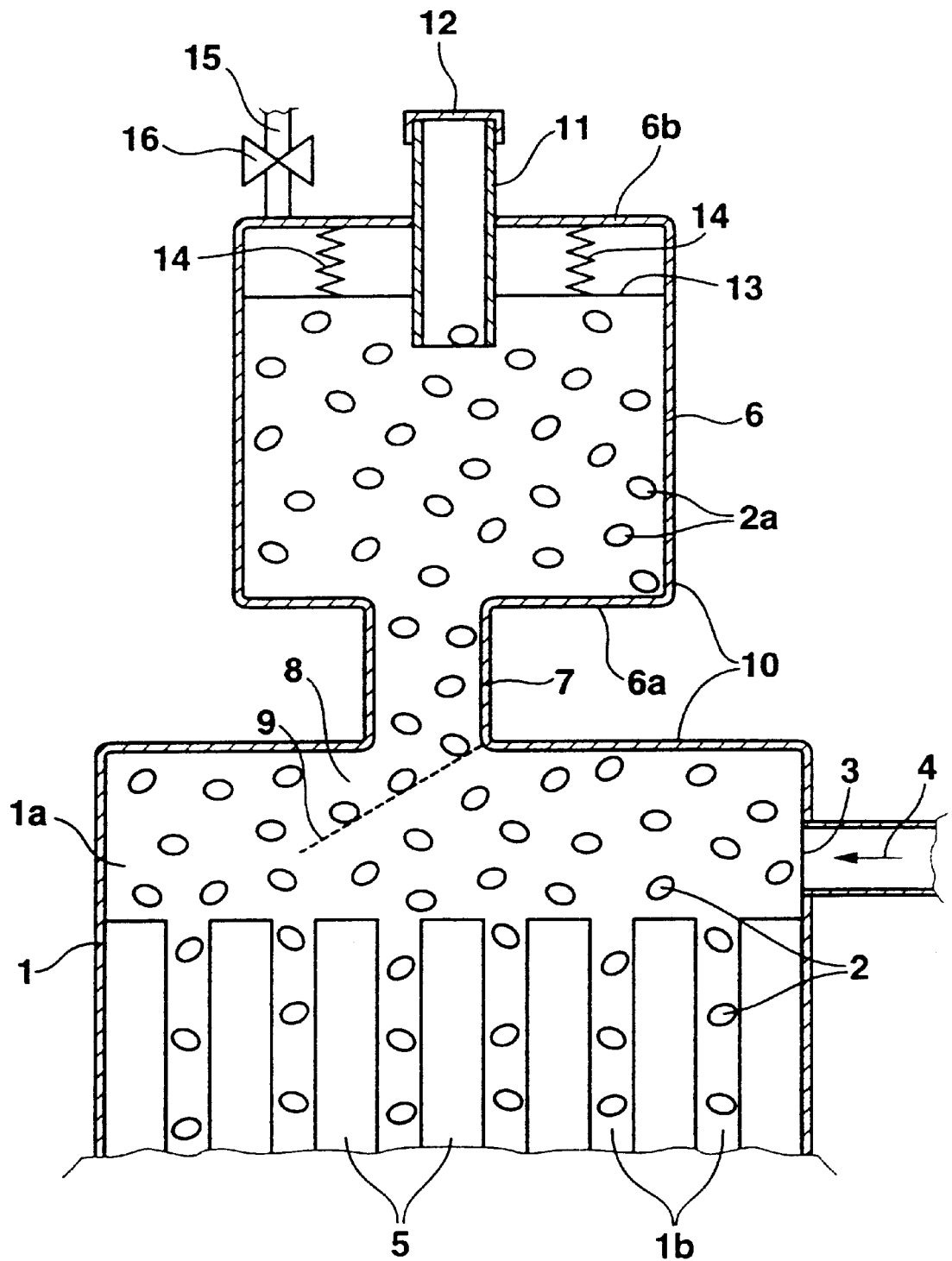

REFORMATION REACTOR WITH CATALYST CHARGING

BACKGROUND AND SUMMARY OF THE INVENTION

This application claims the priority of German application 197 13 244.8, filed Mar. 29, 1998, the disclosure of which is expressly incorporated by reference herein.

The present invention relates to a reformation reactor with a reaction chamber through which a gas stream to be reacted is conducted, and into which a charge of a catalyst material is loaded.

Reformation reactors are known in a wide variety of versions, for example for steam reformation of methanol for obtaining hydrogen, which can be used, for example, as fuel for a fuel cell system. Reactors of this kind are disclosed in, e.g., DE 4423587 A1 and DE 4420752 A1.

In many cases, during the operation of such known reactors, as a result of chemical processes, a reduction in the volume of the catalyst charge takes place in the reaction chamber. This reduction results in a reduction of the reaction rate.

U.S. Pat. No. 2,671,719 discloses a reformation system for industrial production of hydrogen and carbon monoxide, in which initially a hydrocarbon with a metal oxide is reacted in a reduction reaction chamber to form oxides of carbon, hydrogen, water, and free metal, and the associated suspension is then fed as a fountain into a reformation reaction chamber. In this reaction chamber, a solid phase is formed, from which solid particles precipitate and consist of free metal or a reformation catalyst, for example nickel or iron, which is carried in the aluminum or magnesium oxide. The iron component acts as an oxygen carrier, while nickel and the aluminum or magnesium oxide function as primary reformation catalysts. By means of a loading funnel and a supply line which extends from the funnel diagonally downward into the reformation reaction chamber, in which line a valve is provided, by suitable operation of the valve, free iron is added to the reformation reaction chamber. Thereby, significant formation of iron oxide is observed there and for this reason, the solids are released from the reaction chamber through an outlet line.

Utility Model DE 90 00 903 U1 describes a reactor for performing catalytic gas reactions having an essentially spherical pressure-resistant reactor jacket and a spherical catalyst bed located in the reactor jacket, a synthesis gas inlet with a synthesis gas distributor located in the center of the spherical catalyst bed, and at least one synthesis gas outlet. To form a synthesis gas flow which is defined radially from the inside to the outside, the synthesis gas distributor is configured spherical with a perforated outer surface. The synthesis gas outlet is formed by a plurality of gas outlets distributed over the reactor jacket with gas collecting lines penetrating the reactor jacket. In the vicinity of the top of the reactor, a catalyst dome is filled with stored catalyst which can slide automatically downward into the reactor jacket to compensate volume when the reactor is initially started.

DE 40 31 514 A1 discloses a tube sheet reactor for performing catalytic processes in which the catalyst material contained in the tubes shrinks by chemical reduction, for example by way of hydrogen and/or carbon monoxide when the reactor is started, by a certain volume. The upper free ends of the catalyst tubes are equipped with supply chutes whose interior volumes correspond at least to the catalyst volume which prevails or exists when the volume is reduced and in which catalyst material is stored for sliding into the tube area proper when the catalyst volume is reduced. During reactor operation, the tubes are traversed lengthwise by a mixture of materials to be reacted which enters at the upper ends of the tubes and escapes at the lower ends of the tubes.

An object of the present invention is to provide a reformation reactor in which, at relatively low expense, measures are provided to reduce reduction of the volume of catalyst material in the reaction chamber and a resultant undesired reduction of the reaction rate during the operation of the reactor.

The foregoing object has been achieved in accordance with the present invention by providing a reformation reactor in which a catalyst supply container is associated with the reaction chamber. The container is connected with the chamber so that catalyst material is automatically added from the supply container to the reaction chamber. In this way, automatic loading of catalyst material into the reaction chamber is provided, thus compensating for a possible reduction in the volume of the catalyst charge in the reaction chamber. Such a reduction of volume occurs for example in highly loaded methanol reformation catalysts. A high load of catalyst material is required in particular when operating a methanol reformation reactor to generate hydrogen for a fuel cell system in mobile applications for structural reasons.

In the reformation reactor according to the present invention, the catalyst material emerging from the supply container enters the reaction chamber at a point subjected to the flow of gas which has already been reacted partially in the reaction chamber. This measure is especially advantageous for hydrogen reformation of methanol. In this situation, the partially reacted gas already contains a small amount of hydrogen. This hydrogen can be used to form a previously unformed catalyst material, for example for reducing a metal oxide as unformed material into the free metal as the formed catalyst material. Consequently, the catalyst material can be supplied to the supply container in its unformed state which is usually much easier to handle.

In a further improvement on the integrated forming device of the present invention, a gas-permeable heat-conducting reaction guide plate is located at the inlet so that the catalyst material enters from the supply container on the side of the plate facing away from the gas stream into the reaction chamber. With the plate, therefore, the quantity of gas which impacts the catalyst material entering the reaction chamber can be controlled as needed. This control is especially important when unformed catalyst material is stored and can then be formed in a controllable reaction on the side of the reaction guide plate located at the rear in the gas flow direction, for example with the already formed hydrogen quantity from the reformation reaction. The heat which is produced in this exothermal reaction can be carried away by the heat-conducting reaction guide plate to avoid overheating. The heat which is carried away can be supplied to the catalyst material located on the opposite side of the plate, already formed, and catalyzing the endothermal methanol reformation reaction.

The reformation reactor according to the present invention incorporates a device located in the supply container for exerting a position-determining pressure on the catalyst material. Because the supply container is connected to the reaction chamber, the catalyst charge is also positionally fixed in the reaction chamber in a generally simultaneous manner. This position establishment minimizes abrasion phenomena in the catalyst charge which would otherwise occur especially in mobile applications because of the vibration acting on the reactor.

In a yet further improvement of the reformation reactor according to the present invention, the supply container has a vent device so that gases which enter, for example, because of a catalyst formation reaction at the connecting location between the supply container and the reaction chamber into the supply container, can be vented to the exterior.

In a further embodiment of the reformation reactor according to the present invention, the catalyst material is stored in the supply container in the unformed state. Because the unformed material is usually less reactive than the catalyst material in the formed state, the handling of the material is facilitated before and during its addition to the supply container. No special measures are required to keep the catalyst material in the supply container even when stored for long period of time in the formed state.

BRIEF DESCRIPTION OF THE DRAWING

Other objects, advantages and novel features of the present invention will become apparent from the following detailed description of the invention when considered in conjunction with the sole FIGURE.

The single FIGURE is a schematic partial crosssectional elevation view of a reformation reactor with a reaction chamber and a connected supply container.

DETAILED DESCRIPTION OF THE DRAWING

The reformation reactor schematically shown in the sole FIGURE, at least that portion essential to an understanding of the present invention, is applicable especially for steam reformation of methanol in motor vehicles operated by fuel cells for generating the hydrogen required for the fuel cells from methanol supplied in liquid form. The reactor includes a reaction chamber 1, of which only the upper part is shown, filled with a catalyst pellet charge 2, with the catalyst material being chosen so that it catalyzes the desired reformation reaction. For steam reformation of methanol, for example, a $Cu/ZnO/Al_2O_3$ material is suitable, with the catalyst material being placed in reaction chamber 1 in the formed, i.e. catalytically active, state in which it contains, for example, a free metal component such as copper. The upper part of reaction chamber 1 forms a gas inlet chamber 1a, to which a gas stream 4 to be reformed, for example, a methanol/hydrogen mixture, is supplied through a lateral inlet 3. At the gas inlet chamber 1a, reaction chamber channels 1b are connected at the bottom. The channels 1b join tempering fluid channels 5 through which tempering fluid is conducted in order to keep reaction chamber 1 at a temperature suitable for performing the reformation reaction.

A catalyst supply container 6 connected above and with reaction chamber 1 via a loading channel 7. Catalyst material 2a is stored in the supply container 6, preferably in an easily handled unreformed state, including for example a metal oxide component such as CuO which can be converted by an exothermal reduction reaction into the catalytically active, formed, free metal component, Cu for example, for the reformation reaction. The loading channel 7 extends from a central area of a bottom portion 6a of the supply container 6 to a catalyst inlet 8 of the reaction chamber 1, located in a central area at the top of gas inlet chamber 1a of the reaction chamber 1. The inlet 8 is thus removed by approximately half the width of the reaction chamber 1 from the gas inlet 3.

At the gas inlet 8, a perforated reaction guide plate 9 made of a heat-conducting sheet material is mounted by being secured along an upper edge to one side of inlet 8 inside a reactor housing 10 which encloses the reaction chamber 1 and the supply container 6 together with connecting channel 7 and expands diagonally downward therefrom, with partial shielding of the inlet 8, into the gas. inlet chamber 1a. The reaction guide sheet 9 is therefore subjected on its side facing gas inlet 3 to the gas stream 4 supplied to the gas inlet chamber 1a. Because the gas stream 4 has already traversed half the width of the gas inlet chamber 1a filled with active catalyst material or catalyst pellet charge, the stream already contains a certain amount of the reformation reaction products upon reaching the reaction guide sheet 9. In steam reformation of methanol, the gas stream flowing against the reaction guide sheet 9 consequently already contains a certain amount of hydrogen.

The perforation of the reaction guide sheet 9 is chosen so that the incoming gas can flow through in a certain quantity but the diameter of the perforation holes is smaller than the pellet diameter of catalyst charge 2. The reaction guide sheet 9 thus forms a chute through which the catalyst material 2a stored in the supply container 6 can automatically slide into reaction chamber 1, especially into the gas inlet chamber 1a, if the volume of the catalyst charge 2 in the reaction chamber 1 tends to decrease, for example, because of a volume reduction caused by operating stress. The catalyst material 2a coming from the supply container 6 slides on the side of the reaction guide sheet 9 facing away from the gas stream into the gas inlet chamber 1a and thus comes in contact with the quantity, determined by the size and number of perforation holes in the reaction guide sheet 9, with the gas flowing through the reaction guide sheet 9. As a result, the catalyst material sliding into the gas inlet chamber 1a can be controllably formed if present in the unformed state in the supply container 6.

Thus, in steam reformation of methanol, the hydrogen which has been formed in the flow path between the gas inlet 3 and the reaction guide sheet 9 can produce an exothermal formation reaction with the unformed catalyst material 2a supplied as metal oxide with water formation to form the free metal. The perforated reaction guide sheet 9 prevents complete subjection of the unformed catalyst material 2a entering the reaction chamber 1 with the gas stream containing hydrogen and thus prevents the danger of overheating at the catalyst inlet 8 by the exothermal formation reaction. In addition, the heat which is formed during the formation reaction can be carried away by the heat-conducting reaction guide sheet 9 to its opposite side, where the already formed catalytically active catalyst material 2 for performing the endothermal methanol reformation reaction is already located. This controlled application of heat to the methanol-reforming area of the reaction chamber 1 reinforces the maintenance of the required reformation reaction temperature. At the same time, this catalyst formation device integrated into the reactor has the advantage that the catalyst material can be loaded into the supply container 6 in its unreformed state which is more stable in air and is thus easier to handle and stored there.

For adding the catalyst material 2a to be stored, the top of the supply container 6 includes a loading pipe 11 which can be closed by a screw-on lid 12. In addition, the supply container 6 has a pressure-generating device for exerting a pressure on the stored catalyst material 2a. This device consists of a gas-permeable perforated pressure plate 13 and a plurality of coil springs 14 which act as compression springs abutting the inside of cover 6b of the supply container 6 and the pressure plate 13. As a result, the pressure plate 13, located movably in the supply container 6, exerts a position-stabilizing pressure on the stored catalyst material 2a. Because the material 2a is in direct contact with the catalyst charge 2 of the reaction chamber 1 through the loading channel 7, this pressure also acts to determine the position of the catalyst charge 2 in the reaction chamber 1. This position determination minimizes abrasion phenomena which are caused with loose catalyst loading by vorticization of the pellets caused by the gas flow and/or by vibrations such as occur especially in mobile applications.

The device which exerts the pressure on the catalyst material 2, 2a has another advantageous effect. First, it reinforces the automatic sliding of catalyst material from the supply container 6 into the reaction chamber 1, which takes place in the example shown as a result of gravity alone, with supply container 6 being placed at a level above that of reaction chamber 1. Second, the pressure on the catalyst material 2, 2a via the pressure plate 13 in the supply container 6 also permits automatic sliding of the catalyst material when, in a modification of the illustrated embodiment, the supply container 6 is not located above but for example beside the reaction chamber 1.

The top of the supply container 6 is provided with a vent device composed of a vent tube 15 with a vent valve 16 installed therein. Through the vent device, gas which results possibly because of the formation reaction at the inlet location 8 to the reaction chamber 1 and enters through the loading channel 7 into the supply container 6, can escape from the supply container 6 after passing through the gas-permeable pressure plate 13.

Of course, depending on the application, instead of unformed catalyst material, even partially or completely formed catalyst material can be stored in the supply container 6.

As the above description of the illustrated embodiment clearly indicates, in the reformation reactor according to the present invention a reliable, simple, and automatic ability to add catalyst material to the reaction chamber 1 is provided. Thereby, no loss of activity of the reactor takes place as a result of the catalyst charge in the reaction chamber collapsing, making possible a more compact reactor design and a longer service life for the reformation reactor.

When used in vehicles, a reformation reactor according to the present invention requires no separate maintenance process for adding non-reformed catalyst material into the reaction chamber of the reactor followed by forming of the latter with a special forming gas. Instead, the formation reaction can be controllably performed, if necessary, without interrupting the normal reformation operation.

Of course, reformation reactors according to the present invention can be made with a design that is different from the illustrated embodiment. Thus, for example, the reaction guide plate 9 and/or the device which exerts the pressure on the catalyst material can be eliminated. The reactors can be of any desired conventional type as far as their actual reactor part is concerned, particularly the tube sheet or plate reactor type. The use of the reformation reactor according to the present invention is not limited to the steam reformation of methanol, but also includes all applications of reformation reactors with a reaction chamber filled with a catalyst charge.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Reformation reactor, comprising a reaction chamber through which a gas stream to be reformed is flowed and into which a charge of a reformation catalyst material is loaded; a catalyst supply container; a loading channel connecting the catalyst supply container with the reaction chamber, the catalyst supply container being configured such that additional catalyst material is automatically supplied from the supply container into the reaction chamber at a catalyst inlet location between the reaction chamber and the loading channel, and a gas-permeable, heat-conducting reaction guide plate operatively mounted beneath the catalyst inlet location directly downstream of the loading channel such that the additional catalyst material from the supply container enters on one side of the reaction guide plate and the gas stream entering into the reaction chamber is directed toward an opposite side of the reaction guide plate, wherein the loading channel terminates at a location in the reaction chamber which is spaced from a gas inlet through which the gas stream to be reformed by the reformation catalyst material in a portion of the reaction chamber enters into the reaction chamber.

2. The reformation reactor according to claim 1, further comprising a device in the supply containing arranged to exert a position-determining pressure on the reformation catalyst material and the additional catalyst material.

3. The reformation reactor according to claim 1, further comprising a vent device operatively associated with the supply container.

* * * * *